United States Patent [19]
Kern

[11] Patent Number: 4,966,717
[45] Date of Patent: Oct. 30, 1990

[54] OZONE INJECTION SYSTEM AND METHOD

[76] Inventor: Donald W. Kern, 5290 Orcutt Rd., San Luis Obispo, Calif. 93401

[21] Appl. No.: 309,413

[22] Filed: Feb. 10, 1989

[51] Int. Cl.$^5$ .............................................. C02F 1/78
[52] U.S. Cl. ..................................... 210/760; 210/169
[58] Field of Search ..................... 210/760, 169, 220; 239/567, 557, 588, 559

[56] References Cited

U.S. PATENT DOCUMENTS

| | | | |
|---|---|---|---|
| 2,381,589 | 8/1945 | Hayes | 239/567 |
| 2,786,026 | 3/1957 | Stark | 210/169 |
| 3,326,747 | 6/1967 | Ryan et al. | 167/17 |
| 3,336,099 | 8/1967 | Czulak et al. | 210/760 |
| 3,455,803 | 7/1969 | Miller | 204/176 |
| 3,650,950 | 3/1972 | White | 210/60 |
| 3,665,942 | 5/1972 | Moore | 134/167 R |
| 3,684,460 | 8/1972 | Arneson | 23/267 A |
| 3,758,276 | 9/1973 | Bond et al. | 23/267 R |
| 3,765,432 | 10/1973 | Goodin | 134/168 R |
| 3,775,314 | 11/1973 | Beitzel et al. | 210/63 |
| 3,805,815 | 4/1974 | Goodin | 134/167 R |
| 3,823,728 | 7/1974 | Burris | 137/88 |
| 4,019,983 | 4/1977 | Mandt | 210/62 |
| 4,019,986 | 4/1977 | Burris et al. | 210/220 |
| 4,022,382 | 5/1977 | Endahl | 239/557 |
| 4,043,913 | 8/1977 | Hintermeister | 210/169 |
| 4,076,617 | 2/1978 | Bybel et al. | 210/760 |
| 4,087,286 | 5/1978 | Sexton et al. | 134/167 R |
| 4,224,158 | 9/1980 | Molvar | 210/220 |
| 4,581,137 | 4/1986 | Edwards | 210/220 |
| 4,615,802 | 10/1986 | Harbaugh | 210/169 |
| 4,640,783 | 2/1987 | Kern | 210/169 |

FOREIGN PATENT DOCUMENTS 2121396 12/1983 United Kingdom ................ 210/169

*Primary Examiner*—Bernard Nozick
*Attorney, Agent, or Firm*—Gordon L. Peterson; Loyal M. Hanson

[57] ABSTRACT

A system for injecting ozone into the water of a swimming pool includes a source of pressurized ozone, a sparger or dispersion member adapted to be mounted on a separate swimming pool vacuum cleaner head, and a flexible conduit connecting the source of pressurized ozone to the dispersion member. The dispersion member receives ozone through the flexible conduit from the source of pressurized ozone and discharges it into the water of the swimming pool for sanitizing purposes while the vacuum cleaner head is moved about within the water of the swimming pool for cleaning purposes. The flexible conduit may be attached to a separate water suction line connected to the swimming pool vacuum cleaner head and be routed alongside the water suction line through a separate skimmer apparatus, and the dispersion member may be weighted sufficiently to compensate for any buoyancy introduce by the flexible conduit.

15 Claims, 2 Drawing Sheets

OZONE INJECTION SYSTEM AND METHOD

BACKGROUND OF THE INVENTION

1. Technical Field

This invention relates generally to swimming pools, and more particularly to a system that injects ozone in swimming pool water for sanitizing purposes.

2. Background Information

Ozone can be a good substitute for the commercially available chlorine compounds often used for sanitizing swimming pool water. Its odor is less offensive, its effect on the human eye less irritating, and its pH neutral. Thus, use of ozone for this purpose is of interest.

One problem in using ozone for swimming pool water, however, concerns the large volume of essentially non-turbulent water through which the ozone must be dispersed. Thus, injecting the ozone through the fixed water supply outlets for the pool is not effective in sanitizing all of the pool water because the ozone does not disperse throughout all of the water. Although a large number of fixed ozone-injection ports can be installed during swimming pool construction along the bottom of the pool to overcome this problem, such a solution can be very expensive and unavailable for an existing pool.

U.S. Pat. No. 4,640,783 to Kern describes an apparatus in the form of a modified swimming pool cleaner that solves the above problem. Flexible conduits or whip hoses attached to a floatable head snake back and forth in a conventional manner as water pressure moves the head about the pool for cleaning purposes. Sanitizing is accomplished at the same time by utilizing a venturi system to inject ozone into the water supplied by the pool pump to the whip hoses. A relatively inexpensive and effective ozone injection system results that can be used with both new and existing swimming pools.

Sometimes, however, a swimming pool cleaner with whip hoses is not used, such as where a pool blanket is used or where heavy debris and leaves must be picked up so that use of a pool vacuum cleaner is more appropriate. Other times, use of a swimming pool cleaner is inconvenient, such as when people are using the pool or at times when it is desired that the pool pump remain off. In addition, it is sometimes desirable to inject a larger volume of ozone in order to realize the better sanitizing action of a higher ozone concentration. Consequently, it is desirable to have an ozone injection system for such situations.

SUMMARY OF THE INVENTION

This invention solves the problems outlined above by providing an ozone injection system and method that utilize a source of pressurized ozone (such as an ozone generator and compressor) and a flexible conduit to supply ozone under pressure to a sparger mounted on a swimming pool vacuum cleaner head. This can be done without using the floatable swimming pool cleaner with whip hoses so that the pool blanket problem is solved. It can be done in situations where use of the swimming pool cleaner is inconvenient. Because the vacuum cleaner works independently of the pool pump, it can be done with the pool pump off, and because a compressor can push ozone directly into the pool water faster than a venturi system can inject it into the pool supply water, it can be done to supply ozone at a greater rate for better sanitizing action.

Generally, a system constructed according to a major aspect of the invention for injecting ozone into the water of a swimming pool includes a source of pressurized ozone, a sparger member, and a flexible conduit. The sparger member is adapted to be mounted on a separate swimming pool vacuum cleaner head where it serves as means for receiving ozone from the source of pressurized ozone and discharging the ozone into the water of a swimming pool as the vacuum cleaner head is moved about within the water of the swimming pool. The flexible conduit connects the source of pressurized ozone to the sparger member.

In line with the above, the method of injecting ozone into the water of a swimming pool according to the invention includes the steps of providing a source of pressurized ozone, a swimming pool vacuum cleaner head, a dispersion member carried by the vacuum cleaner head, and a flexible conduit connecting the source of pressurized ozone to the dispersion member. The method proceeds by conducting ozone through the flexible conduit from the source of pressurized ozone to the dispersion member, discharging ozone from the dispersion member into the water of a swimming pool, and moving the vacuum cleaner head about within the water of the swimming pool while the dispersion member discharges ozone received through the flexible conduit from the source of pressurized ozone for sanitizing purposes.

The above mentioned and other objects and features of this invention and the manner of attaining them will become apparent, and the invention itself will be best understood, by reference to the following description taken in conjunction with the accompanying illustrative drawings.

DESCRIPTION OF THE PREFERRED EMBODIMENTS

Figure 1:
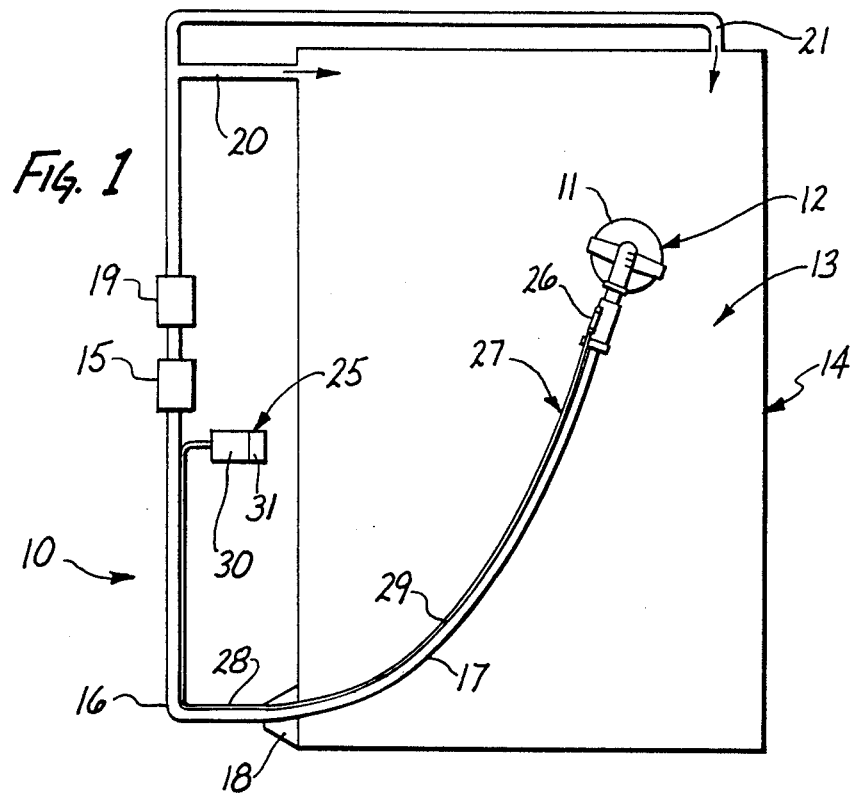
FIG. 1 of the drawings is a diagrammatic view of an ozone injection system constructed according to the invention.

Referring now to the drawings, there is shown an ozone injection system or system 10 constructed according to the invention, illustrated diagrammatically in FIG. 1. It is installed for use with a vacuum cleaner head 11 of a swimming pool vacuum cleaner 12 in order to inject ozone ($O_3$) into the water 13 of a swimming pool 14 for sanitizing purposes. It can be configured for most any type of swimming pool, such as a backyard residential swimming pool.

The vacuum cleaner head 11 serves as a vehicle for components subsequently described. Thus, the terms "vacuum cleaner head" and "swimming pool vacuum cleaner" are intended to include any of various devices and swimming pool accessories having some type of head or other component that operates independently of the pool water supply pump and that can be moved about within the water 13 as a vehicle for those components.

Figure 4:
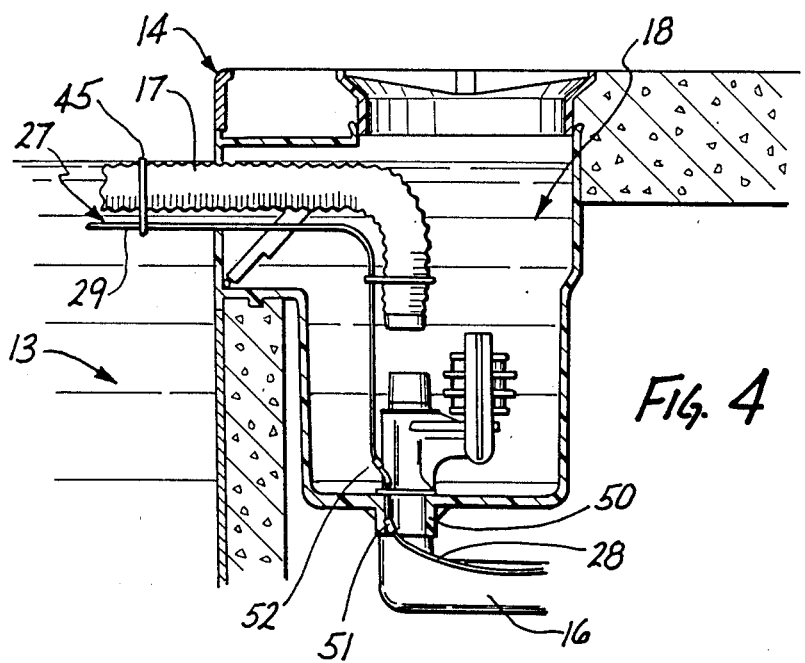
FIG. 4 is an enlarged cross sectional view of a conventional skimmer utilized with the vacuum cleaner, showing one way of routing the ozone-carrying tubing.
Figure 2:
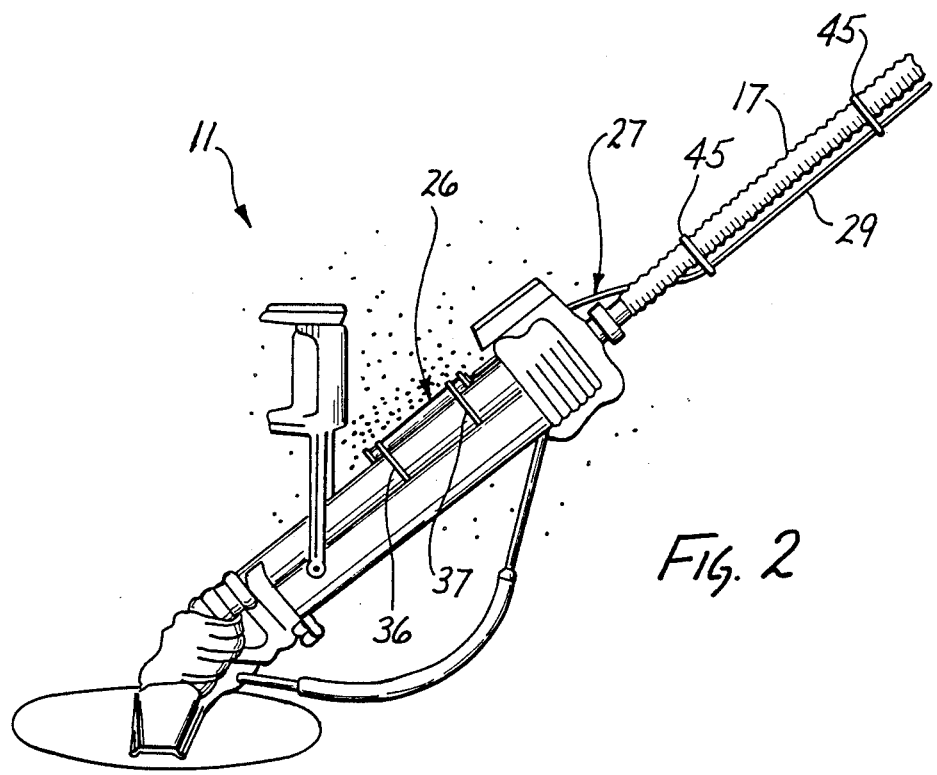
FIG. 2 is a perspective view of the sparger mounted on the swimming pool vacuum cleaner head.
Figure 3:
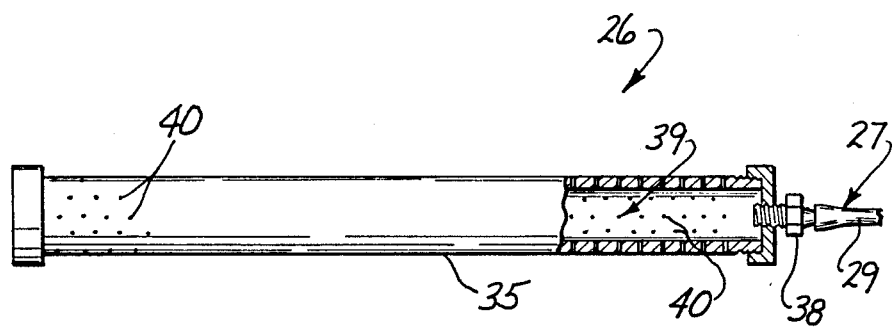
FIG. 3 is an enlarged elevation view of the sparger with portions in cross section.

The swimming pool vacuum cleaner 12, for example, is a commercially available unit such as that sold by Kreepy Krawly USA, Inc. of Plantation Florida. It includes a pump 15 connected in fluid communication with the vacuum cleaner head 11 by first and second suction lines or conduits 16 and 17 that join at a skimmer apparatus 18 (FIGS. 1 and 4). The pump 15 operates conventionally to draw the water 13 through the vacuum cleaner head 11, the second suction line 17, the skimmer apparatus 18, and the first suction line 16 in order to vacuum debris from the swimming pool 14. The water 13 is then filtered by a filter 19 and reintroduced into the swimming pool 14 through water return lines 20 and 21.

The vacuum cleaner head 11 includes a propulsion arrangement, such as a known type of water responsive drive arrangement, that operates to move the vacuum cleaner head 11 about within the water 13. For the vacuum cleaner head 11, this is accomplished by the inward suction of water which causes the vacuum cleaner head 11 to move about within the water 13. However, it is within the broader inventive concepts disclosed to utilize other means for moving the vacuum cleaner head 11, including an extension pole or handle that can be grasped for purposes of moving it about within the water 13 manually.

Although various vehicles can be used, the system 10 is configured for use with a swimming pool vacuum cleaner, and it includes a source of pressurized ozone 25 (FIG. 1), a dispersion member or sparger 26 (FIGS. 1–3), and a flexible conduit or hose 27 that connects the source of pressurized ozone 25 and the sparger 26 in fluid communication (FIGS. 1–4). These components are configured to cooperate with the swimming pool vacuum cleaner 12 in order to achieve the advantages discussed previously, the hose 27 of the system 10 having first and second sections 28 and 29 that can be routed through the skimmer apparatus 18 as described subsequently.

The source of pressurized ozone 25 includes a known type of compressor 30. It may be a commercially available, electrically powered unit, for example. It receives ozone from a known type of ozone generator 31, and it operates conventionally to pressurize the ozone and output the pressurized ozone to the hose 27 and thereby to the sparger 26.

The sparger 26 may take any of various forms suitable for mounting on the vacuum cleaner head 11 (or other vehicle). It serves as dispersion means adapted to be mounted on a separate swimming pool vacuum cleaner head for receiving ozone from the source of pressurized ozone and discharging the ozone into the water of a swimming pool while the vacuum cleaner head is moved about within the water of the swimming pool, and it is configured accordingly so that it can receive a flow of ozone and discharge it into the water 13.

In that regard, the sparger 26 includes an elongated cylindrical member 35 (FIG. 3) composed of a metal alloy to give it sufficient weight to offset any buoyancy introduced by the hose 27 (although other materials such as a thermoplastic material may be used instead with a separate weighting arrangement), and the elongated member 35 is secured to the vacuum cleaner head 11 by suitable means such as clips 36 and 37 (FIG. 2), either directly to the vacuum cleaner head 11 or by means of mounting it on the second suction line 17 or other connected structure. Thus, the clips serve as means for mounting the sparger member 26 on the swimming pool vacuum cleaner head 11, and they are configured according to known techniques to mechanically secure the sparger 26 as desired, such as injection molded thermoplastic ties that can be twisted like garbage bag ties or such as form-fitted, plastic clips that can be snapped onto the vacuum cleaner head 11 to retrofit the system 10 to an existing swimming pool vacuum cleaner.

Ozone pumped through the hose 27 and through an inlet connector 38 (the inlet of the sparger 26) into a closed hollow interior 39 of the elongated member 35 discharges through a plurality of outlets or openings 40 in the elongated member 35 (FIG. 3) into the water 13. This occurs, preferably, as the vacuum cleaner head 11 is moved about within the water 13, either by action of the water responsive drive mentioned above or otherwise, such as manually. The elongated configuration enhances ozone dispersion, but other configurations may be employed without departing from the inventive concepts disclosed.

The first and second sections 28 and 29 of the hose 27 may be lengths of commercially available, flexible hose, such as ¼-inch diameter, ozone-resistant hose, for example, that can be cut to length by a user and slipped onto commercially available, barbed fittings, such as the input connector 38. The second section 29 is secured to the second suction line 17 by suitable means such as plastic clips 45 (FIGS. 2 and 4) that serve as means for attaching the flexible conduit or hose 27 to the second suction line 17.

Operationally, the user first installs or otherwise provides the source of pressurized ozone 25 (outside of the swimming pool 14), a swimming pool vacuum cleaner head 11 (or other vehicle), a dispersion member or sparger 26 carried by the vacuum cleaner head 11, and a flexible conduit or hose 27 connecting the source of pressurized ozone 25 to the sparger 26. Then, ozone is conducted through the hose 27 from the source of pressurized ozone 25 to the sparger 26, and the ozone is discharged from the sparger 26 into the water 13 of the swimming pool 14, preferably while the vacuum cleaner head 11 is moved about within the water 13 of the swimming pool 14.

Installation may include attaching the hose 27 to at least the second suction line 17. The clips 45 are used for this purpose. Installation may also include routing the hose 27 alongside the first suction line 16 (either inside or outside of the first suction line 16) and through the skimmer apparatus 18. This is depicted generally in FIG. 1 by the first section 28 of the hose 27 lying outside of the first suction line 16, but it may be done by routing the first section 28 within the first suction line 16, as illustrated in FIG. 4, and utilizing a special fitting 50 that is configured to replace the lip cone or threaded adapter commonly employed to couple a vacuum regular 51 of the skimmer 18 to the first suction line 16. The fitting 50 includes a first barbed fitting 51 that receives the first section 28 of the hose 27, and a second barbed fitting 52 (in fluid communication with the first fitting 51) that receives the second section 29 of the hose 27. Each of the first and second sections 28 and 29 is slipped onto a respective one of the barbed fittings 51 and 52, and this provides a convenient and neat installation.

Thus, this invention utilizes a source of pressurized ozone and a flexible conduit to supply ozone under pressure to a sparger mounted on a swimming pool vacuum cleaner head. This can be done without using the floatable swimming pool cleaner with whip hoses so that the pool blanket problem is solved. It can be done in situations where use of the swimming pool cleaner is inconvenient. It can be done with the pool pump off, and it can be done to supply ozone at a greater rate for better sanitizing action.

Although an exemplary embodiment of the invention has been shown and described, many changes, modifications, and substitutions may be made by one having ordinary skill in the art without necessarily departing from the spirit and scope of the invention.

What is claimed is:

1. A method of injecting ozone into the water of a swimming pool, comprising:
    providing a source of pressurized ozone, a swimming pool vacuum cleaner head, a dispersion member carried by the vacuum cleaner head, and a flexible conduit connecting the source of pressurized ozone to the dispersion member;
    conducting ozone through the flexible conduit from the source of pressurized ozone to the dispersion member;
    discharging ozone from the dispersion member into the water of a swimming pool; and
    moving the vacuum cleaner head about within the water of the swimming pool while the dispersion member discharges ozone received through the flexible conduit from the source of pressurized ozone for sanitizing purposes.

2. A method as recited in claim 1, wherein the step of providing a source of pressurized ozone includes:
    providing a source of pressurized ozone outside the swimming pool.

3. A method as recited in claim 1, further comprising:
    attaching the flexible conduit to a separate water suction line connected to the swimming pool vacuum cleaner head.

4. A method as recited in claim 3, further comprising:
    routing the flexible conduit alongside the water suction line through a separate skimmer apparatus.

5. A system for injecting ozone into the water of a swimming pool, comprising:
    a source of pressurized ozone;
    dispersion means for receiving ozone from the source of pressurized ozone and discharging the ozone into the water of a swimming pool;
    means for mounting the dispersion means to a swimming pool vacuum cleaner head; and
    a flexible conduit connecting the source of pressurized ozone to the dispersion means.

6. A system as recited in claim 1, wherein the dispersion means includes:
    a sparger member having an input connected to the flexible conduit and a plurality of outlets through which to discharge the ozone; and
    said mounting means includes means for mounting the sparger member on the swimming pool vacuum cleaner head.

7. A system as recited in claim 1, further comprising:
    means for attaching the flexible conduit to a separate conduit.

8. A system as recited in claim 1, wherein:
    the dispersion means is weighted sufficiently to compensate for any buoyancy introduced by the flexible conduit.

9. A system as recited in claim 1, wherein the source of pressurized ozone includes:
    an ozone generator; and
    a compressor.

10. A system for injecting ozone into the water of a swimming pool, comprising:
    a source of ozone;
    a compressor for compressing ozone;
    a dispersion member for discharging ozone into the water of a swimming pool;
    a flexible conduit for connecting the compressor to the dispersion member; and
    means for mounting the dispersion member on a vacuum cleaner head of a swimming pool vacuum cleaner;
    whereby the dispersion member can receive ozone from the compressor and discharge the ozone into the water of the swimming pool for sanitizing purposes.

11. A system for injecting ozone into the water of a swimming pool, comprising:
    a swimming pool vacuum cleaner having a vacuum cleaner head;
    a sparger member mounted on the vacuum cleaner head;
    a source of pressurized ozone; and
    a flexible conduit connecting the source of pressurized ozone to the sparger member;
    whereby the sparger member can receive ozone from the source of pressurized ozone and discharge the ozone into the water of a swimming pool for sanitizing purposes.

12. A system as recited in claim 11, wherein the source of pressurized ozone includes:
    an ozone generator; and
    a compressor.

13. A system as recited in claim 11, wherein the swimming pool vacuum cleaner includes:
    a water responsive drive arrangement.

14. A system as recited in claim 11, wherein:
    the swimming pool vacuum cleaner includes a pump, a skimmer, a first suction line connecting the pump to the skimmer, and a second suction line connecting the skimmer to the vacuum cleaner head; and
    the flexible conduit extends along the first suction line, through the skimmer, and along the second suction line to the sparger member.

15. A system as recited in claim 14, wherein:
    the flexible conduit extends inside of the first suction line and outside of the second suction line.

* * * * *

UNITED STATES PATENT AND TRADEMARK OFFICE
CERTIFICATE OF CORRECTION

PATENT NO. : 4,966,717

DATED : October 30, 1990

INVENTOR(S) : Donald W. Kern

It is certified that error appears in the above-identified patent and that said Letters Patent is hereby corrected as shown below:

Column 5, line 57 change "claim 1" to -- claim 5 --.

Column 6, line 4 change "claim 1" to -- claim 5 --.

Column 6, line 7 change "claim 1" to -- claim 5 --.

Column 6, line 11 change "claim 1" to -- claim 5 --.

Signed and Sealed this

Twenty-ninth Day of September, 1992

Attest:

DOUGLAS B. COMER

*Attesting Officer*  *Acting Commissioner of Patents and Trademarks*